(12) United States Patent
Graham et al.

(10) Patent No.: US 10,499,092 B2
(45) Date of Patent: Dec. 3, 2019

(54) METHOD OF BROADCASTING OF SAME DATA STREAM TO MULTIPLE RECEIVERS THAT ALLOWS DIFFERENT VIDEO RENDERING OF VIDEO CONTENT TO OCCUR AT EACH RECEIVER

(71) Applicant: Inspired Gaming (UK) Limited, London (GB)

(72) Inventors: Daniel Graham, Stockport (GB); Alistair Hopkins, Gwynedd (GB)

(73) Assignee: Inspired Gaming (UK) Limited, London (GB)

( * ) Notice: Subject to any disclaimer, the term of this patent is extended or adjusted under 35 U.S.C. 154(b) by 0 days.

(21) Appl. No.: 15/886,378

(22) Filed: Feb. 1, 2018

(65) Prior Publication Data

US 2019/0238909 A1    Aug. 1, 2019

(51) Int. Cl.

| | |
|---|---|
| H04N 21/2343 | (2011.01) |
| H04N 21/237 | (2011.01) |
| H04N 21/258 | (2011.01) |
| H04H 20/28 | (2008.01) |
| H04N 21/235 | (2011.01) |
| H04N 21/236 | (2011.01) |
| H04N 21/2668 | (2011.01) |
| H04N 21/431 | (2011.01) |
| H04N 21/854 | (2011.01) |

(52) U.S. Cl.
CPC ...... *H04N 21/23439* (2013.01); *H04H 20/28* (2013.01); *H04N 21/237* (2013.01); *H04N 21/2351* (2013.01); *H04N 21/23614* (2013.01); *H04N 21/25816* (2013.01); *H04N 21/2668* (2013.01); *H04N 21/4312* (2013.01); *H04N 21/85406* (2013.01)

(58) Field of Classification Search
CPC .......... H04N 21/23439; H04N 21/237; H04N 21/25816; H04N 21/2351; H04N 21/4312; H04N 21/2668; H04N 21/23614; H04N 21/85406; H04H 20/28
See application file for complete search history.

(56) References Cited

U.S. PATENT DOCUMENTS

| | | |
|---|---|---|
| 5,541,662 A | 7/1996 | Adams et al. |
| 7,039,933 B1 | 5/2006 | Chen et al. |
| 7,178,161 B1 | 2/2007 | Fristoe et al. |

(Continued)

OTHER PUBLICATIONS

Int'l Search Report and Written Opinion dated Apr. 10, 2019 in Int'l Application No. PCT/IB2019/050764.

*Primary Examiner* — Benjamin R Bruckart
*Assistant Examiner* — Aklil M Tesfaye
(74) *Attorney, Agent, or Firm* — Panitch Schwarze Belisario & Nadel LLP

(57) ABSTRACT

A remote server generates a data stream that is broadcasted to a plurality of receivers. The broadcasted data stream includes a video track having a video data stream, a control track, and a plurality of ancillary data tracks including ancillary data. A specific template is assigned to each of the receivers. Each of the receivers renders a composite video image for display on a display device. Each of the composite video images includes the same video data stream, but each receiver uses its assigned template and selected ancillary data to render its own unique composite video image from the same video data stream.

17 Claims, 10 Drawing Sheets

(56) References Cited

U.S. PATENT DOCUMENTS

| | | | | |
|---|---|---|---|---|
| 2006/0271996 A1* | 11/2006 | Sato | ................... | H04N 5/445 |
| | | | | 725/135 |
| 2007/0021058 A1 | 1/2007 | Arseneau et al. | | |
| 2008/0101456 A1 | 5/2008 | Ridge et al. | | |
| 2009/0089838 A1* | 4/2009 | Pino, Jr. | ............... | G06Q 30/02 |
| | | | | 725/40 |
| 2012/0198572 A1* | 8/2012 | Beals | ................... | G06F 21/42 |
| | | | | 726/34 |
| 2015/0326393 A1 | 11/2015 | Takashima et al. | | |
| 2016/0088319 A1* | 3/2016 | Zucchetta | ........ | H04N 21/41415 |
| | | | | 725/25 |
| 2017/0142460 A1* | 5/2017 | Yang | ............... | H04N 21/25816 |
| 2018/0146217 A1* | 5/2018 | Kedenburg, III | .. | H04N 21/2187 |

* cited by examiner

METHOD OF BROADCASTING OF SAME DATA STREAM TO MULTIPLE RECEIVERS THAT ALLOWS DIFFERENT VIDEO RENDERING OF VIDEO CONTENT TO OCCUR AT EACH RECEIVER

BACKGROUND OF THE INVENTION

Field of the Invention

The present invention relates generally to simplex video stream broadcast channels, such as satellite video, broadcast from a single transmission source to multiplicities of receivers, and more particularly to methods for inserting selective additional channel(s) of data assembled in real time to produce a seamless appearing composite video that is potentially customizable at each receiver. Specifically, this innovation provides a reduction in bandwidth and costs when transmitting additional data in parallel to a continuous video stream over a noisy simplex channel while ensuring secure access with per-receiver authorization and control. While the methods disclosed with the present invention could be of utility to any type of video stream, the benefits are particularly acute for the video transmission of sporting events with bet data associated with those events.

Background

With most current video streaming standards, there are no generic mechanisms that enable the insertion or overlay of ancillary data. Typically, once a video stream is transmitted, it is not modified. The addition of graphical overlays, animations and inserted sequential or concurrent program segments have only been possible by decoding the video sequence, rendering the overlay or program segment to be inserted, positioning the content to be added (either spatially or temporally) and then re-encoding the composite sequence. This is a complex and expensive process that can cause fidelity loss as well as possible loss of embedded content and is extremely difficult to implement in an individually customizable basis over multiplicities of receivers in a Wide Area Network (WAN).

Some legacy prior art video streaming standards merely provide mechanisms for including data associated with an incoming video signal. Such associated data is typically received during vertical blanking intervals of the incoming video signal. In such prior systems, the functions of the associated data in relation to the incoming video signal is usually fixed according to the design of the television receiving system—e.g., closed caption.

The problem of data insertion is particularly vexing for satellite video broadcasts to a chain of licensed retailers displaying both sports and associated betting content. Typically, different video streams are broadcast for each retail chain, with the customization branding and betting odds being added at the transmission source. However, this method has the disadvantage of high costs (especially for satellite bandwidth) with substantial set-up time and effort, particularly concerning the management of events and their respective states, especially when transmitting data in real time.

Some attempts to mitigate the problem of real time ancillary data insertion into a video stream over a simplex channel have been attempted. For example, U.S. Pat. No. 7,039,933 (Chen et. al.) teaches inserting tags (i.e., markers) into the video stream transmission that essentially flag specific times for insertion of alternate (local) video enhancements. However, in U.S. Pat. No. 7,039,933, alternate (local) video enhancements are inserted by a local system that modifies the video stream transmission as specified by the inserted tags and then retransmits the resulting modified video stream to local area set-top-boxes (column 4, line 62 thru column 5, line 10 of U.S. Pat. No. 7,039,933). Thus, U.S. Pat. No. 7,039,933 only enables "local" video stream modification via an intermediary rebroadcast and consequently does not readily support customization on an individual user (e.g., set-top-box) basis.

U.S. Pat. No. 5,541,662 (Adams et. al.) teaches "provid [ing] flexible content programming control in an interactive video system" via a "video system that receives a video data stream and an associated data stream" wherein the video system "displays a video image defined by the video data stream on a display device and performs command functions specified by the associated data stream" (see, column 2, lines 19-20 and 59-65). However, U.S. Pat. No. 5,541,662 principally provides a global video enhancement or rendering with interactive capabilities. U.S. Pat. No. 5,541,662 is completely silent on enabling the insertion or overlay of ancillary data on an individual per-device basis and again does not readily support customization on an individual user (e.g., set-top-box) basis.

U.S. Patent Application Publication No. 2008/0101456 (Ridge et. al.) teaches creating Supplemental Enhancement Information (SEI) messages to control and manage the insertion and/or overlay of multi-planar visual content within an underlying visual media (paragraph [0022]) specifying types of SEI message fields (paragraphs [0024]-[0046]) to accomplish this purpose. However, U.S. Patent Application Publication No. 2008/0101456 is largely silent regarding how the SEI message fields are managed and controlled, particularly in a simplex WAN comprised of multiplicities of individual users. Particularly, U.S. Patent Application Publication No. 2008/0101456 fails to identify how individual users are identified and authorized for targeted video insertions.

To date, existing systems do not manage events or states while providing corresponding customized data on an individual user basis. Additionally, existing systems are virtually silent on introducing individual custom data while minimizing bandwidth requirements, especially over a noisy channel. The present invention essentially eliminates or solves these problems of customized data rendering on top of a generic video feed, in a state dependent basis, varying from one individual user to another.

SUMMARY OF THE INVENTION

In a general embodiment, the present invention relates to broadcasting, via a first remote server in a combined simplex data stream, common (typically high-resolution) video data with a control track and a multiplicity of ancillary data tracks transferring ancillary data. This combined broadcast is then received by a plurality of receivers with every receiver displaying on a respective display device a combined rendering of the common video data stream and receiver unique customized data derived from processing selective portions of the broadcast data stream.

Each of the plurality of receivers includes a common software application as well as a unique asymmetrical public-private key pair. The asymmetrical public-private key pair associated with each receiver is unique throughout the broadcast system as is a unique name, which in one embodiment is the unique public key, assigned to each receiver before it is authorized.

A second remote sever enables individual receiver authorization to process selected portions of the broadcast by receiving each receiver's public key via an arbitrary return back channel that is independent of the simplex broadcast data channel. The second remote sever enrolls the unique public key of each receiver by recording the public key into a local database along with the specifications (e.g., physical address of receiver's location, name of associated business establishment, time zone, country, numbering format) associated with the receiver's public key.

Within this general embodiment, the first remote server originates and transmits the simplex broadcast data stream, control track, and plurality of typically low-bandwidth ancillary data tracks. Initial individual receiver authorization and general-purpose data (i.e., unsynchronized) is transmitted via the control track with specific (i.e., synchronized) display rendering data transmitted to each receiver via discrete ancillary data tracks. Receiver authorization data generated from the receiver's public key and associated specifications previously received by the second remote server are utilized by the first remote server to enroll and authorize each receiver in an unsynchronized manner. These same received specifications are also used by the first remote server to format the ancillary data tracks for their respective receivers for rendering of the composite display of unique data with the common video data stream.

In a specific aspect of this general embodiment, the assembled control and ancillary data tracks are broadcast continuously, including time periods where no video data stream are broadcast. The simplex nature of the broadcast data stream prohibits any acknowledgement of data receipt from the plurality of receivers; therefore, to safeguard receiver data receipt over noisy channels the continuous broadcast of control and ancillary data tracks provides redundancy thereby increasing the likelihood of data receipt and consequently full receiver functionality.

With another aspect of the general embodiment of the present invention, the broadcast ancillary data includes extensive error correction and error detection to ensure that only complete and correct data is rendered in the composite video. The default for questionable or partially missing data being to redact all portions during an error condition—e.g., displaying incorrect betting odds of "1:10" with a dropped digit instead of the intended "1:100" would constitute an unacceptable catastrophic failure, consequently a generic error indicium would be alternatively displayed in this example.

Another aspect of the present invention relates to synchronizing various states of the ancillary data with the video stream data such that different composite renderings appear at the correct times and locations so as to be compatible with the general video stream at all times. This synchronizing of various states occurring in real time utilizing ancillary data typically broadcast in real time.

In yet another aspect of the present invention, venue unique templates are generated by the first remote server that generically describe rendering details based on: specific subsets of ancillary data, formatting instructions derived from an individual receiver's specifications, the type of video data stream in which the rendering will occur (e.g., virtual horse race, virtual boxing match, dart tournament), and the state of the specified video data stream (e.g., pending, preamble, no more bets, running, results) that the template will be rendered. The templates themselves functioning as virtual structures for later insertion of ancillary data defining (among other things) the parsing of the ancillary data, the ancillary data's formatting, the positioning of the ancillary data in the composite rendering, and the like. These defined templates are broadcast to the plurality of receivers via the control track, preferably in advance of the time when they are required. In this manner, each receiver has an assigned template.

In a specific embodiment of the present invention, the plurality of receivers are physically generic Set Top Boxes ("STBs"). These generic set top box receivers include software (preferably an applet) that allow the generic set top box receivers to receive and render the authorization and rendering data disclosed in the present invention.

In another specific embodiment, symmetrical encryption keys are downloaded to the plurality of receivers from the first remote server, thereby allowing the receivers to process encrypted templates, ancillary data, and the like, in an efficient manner. Preferably, the transmitted symmetrical encryption keys are individually encrypted with each receiver's respective public key with the decrypted cleartext symmetrical key used for normal operation. The symmetrical encryption process providing security, integrity, and authentication for the broadcast data.

In an alternative embodiment, the broadcast data is transmitted via a half or full duplex channel. In this alternative embodiment, the return channel can be optionally employed for receiver acknowledgement of receipt of data.

In all of these embodiments, a first remote server transmits combined video, control, and ancillary data tracks to a plurality of receivers that render the video and ancillary data in a composite video display that can be unique to each receiver. The essential concept of the invention is to provide uniquely formatted custom data in synchronization with a broadcast video data stream error free using hereto unknown small amounts of bandwidth over a noisy transmission channel in a simplex fashion.

A number of transmission mechanisms and methodologies are described that provide practical details for reliably transmitting a common video data stream with multiplicities of unique ancillary data that provide for synchronized and error free distinctive rendered displays generated by a plurality of receivers. Although the examples provided herein are primarily related to sporting events and the betting data associated with those sporting events, it is clear that the same methods are applicable to any type of common video broadcast where a plurality of receivers each display specific ancillary data—e.g., shopping channel with customized pricing, election results with localized voting by district details.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
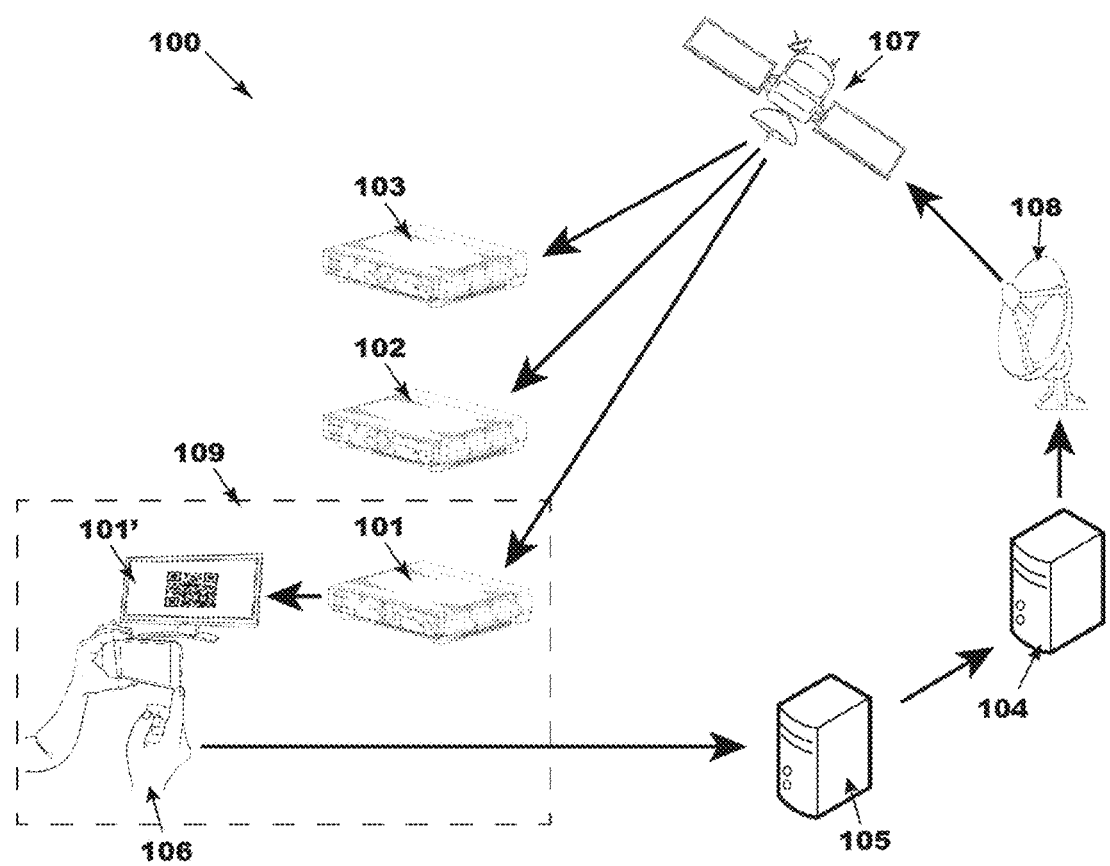
FIG. 1A is a block diagram providing a schematic graphical overview of a general embodiment as applied to reliably for reliably transmitting a common video data stream with unique ancillary data providing synchronized and error free distinctive rendered displays generated by a plurality of receivers.

Certain terminology is used herein for convenience only and is not to be taken as a limitation on the present invention. The words "a" and "an", as used in the claims and in the corresponding portions of the specification, mean "at least one." In the context of the present invention, "track" refers to a sub-channel of allocated bandwidth that is a portion of the main data stream communications channel. The term "simplex", known well in the art and repeated here for clarity, means a communication channel that sends information in one direction only. The abbreviation "UFTP", also known well in the art, denotes "UDP-based File Transfer Protocol", where "UDP" is an abbreviation for "User Datagram Protocol"—i.e., one of the core members of the Internet Protocol suite. "Set Top Box" or "STB" is an information appliance device with memory and a processor that receives an analog or digital input signal (e.g., satellite broadcast) and displays an output to a monitor or television set. The STB tunes to and demodulates the external source signal, turning the source signal into content in a form that then be displayed on the television screen or other display device. In the context of the present invention, "STB" and "receiver" are used interchangeably. The terms "customized" and "local" may refer to a single store or establishment's video rendering or a chain of store's all sharing the same rendering. The term "venue" as used herein describes a physical place or places where the customized rendered video of the present invention is displayed. In some contexts, the "venue" could be a single store or address of the store. In other contexts, the "venue" could be a chain of stores all owned by the same company. In still other contexts, the "venue" could even be a country when at least two countries receive the same common video data.

Reference will now be made in detail to examples of the invention, one or more embodiments of which are illustrated in the drawings. Each example is provided by way of explanation of the invention, and are not meant as limitations of the invention. For example, features illustrated or described as part of one embodiment may be used with another embodiment to yield still a further embodiment. The present invention encompasses these and other modifications and variations as come within the scope and spirit of the invention.

FIG. 1A depicts a block diagram providing a schematic graphical exemplary overview 100 of a general embodiment of the present invention. In example 100, there are three receivers 101-103 depicted as Set Top Boxes ("STBs") all receiving the same simplex signal from the same satellite 107. The satellite's transponder relays a combined simplex data stream transmitted 108 from a first remote server 104 that originated the combined simplex data stream. Prior to being able to receive and process the combined simplex data stream, an individual receiver or STB 101 must first be enrolled and authorized on the system. This process is symbolically highlighted in dashed area 109, where a newly installed STB 101 upon boot-up runs the generic software or applet previously loaded into all STBs (101-103) to determine if a unique asymmetrical key pair are present in its local memory and if the booted STB has been authorized on the system or not. If no authorization data can be found in the STB's local memory, it defaults to displaying a newly generated or stored asymmetrical public key on its associated display preferably in a two-dimensional barcode format 101' (a detailed rendering of this display is provided in FIG. 2B). As discussed in more detail later in this document, displaying the public key in a machine readable two-dimensional barcode format (227, FIG. 2B) is preferable to other human readable formats, since asymmetrical public keys are long in length and therefore extremely difficult for a human to encode without error.

Returning to FIG. 1A, when a non-authorized or enrolled STB 101 boots-up and displays its public key 101', the human installer 106 runs an application or "app" on his or her smart phone to scan and decode the displayed public key 101'. The scanned public key and other supplementary specifications (e.g., name and address of the establishment, country of the establishment, time zone of the establishment, affiliation of the establishment) is manually entered or scanned by the human installer 106 into the app and then transmitted to a second remote server 105 via a back channel, which logs the public key and supplementary specifications into a database, passing the logged data to the first remote server 104, which subsequently sends out an authorization data packet. Thus, the newly enrolled receiver is now able to accept and process a common video track combined with venue unique data, thereby producing a customized composite image. In one preferred embodiment, the supplementary specifications entered or scanned by the human installer 106 include a unique name for the establishment, thereby individually identifying the establishment in a machine and human readable fashion across the system. Alternatively, the receiver or STB can be uniquely identified in the system by its public key alone. One disadvantage of this alternative embodiment is that public keys are typically long in length (e.g., 2,048 bits) and consequently extremely difficult for a human to read or identify.

Figure 4A:
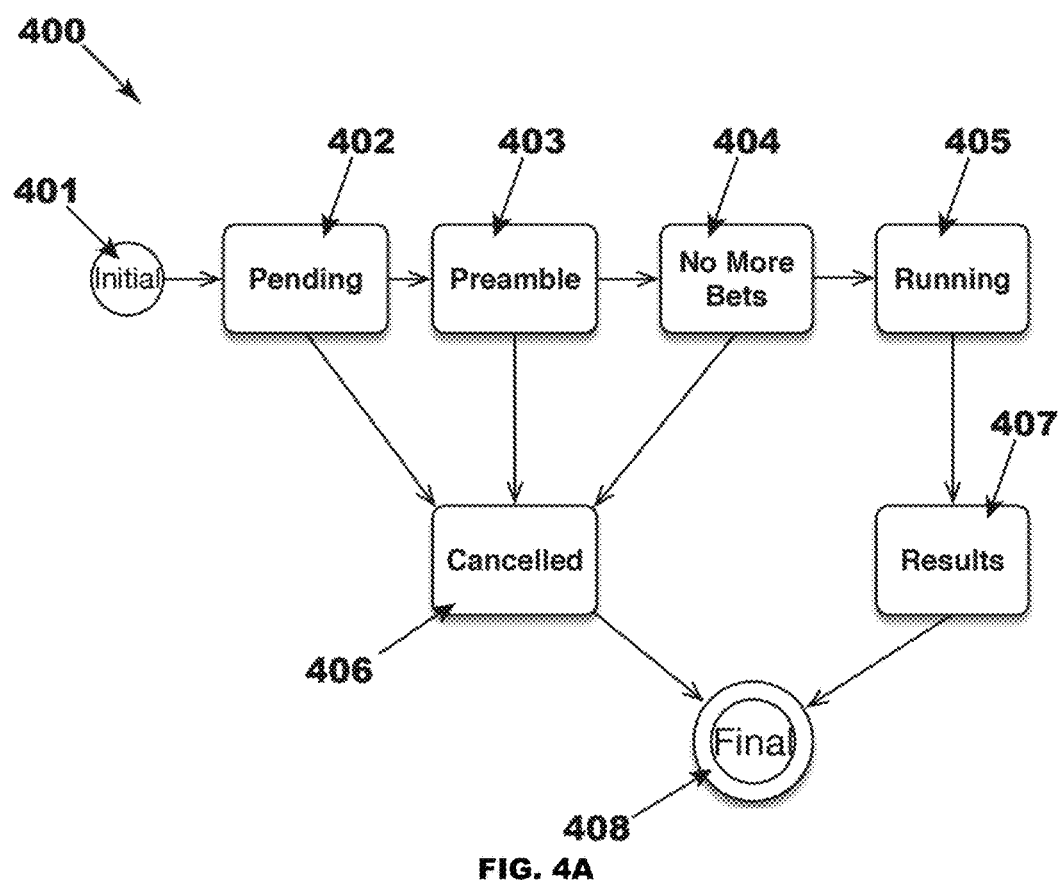
FIG. 4A is an overall logical state machine rendering representative example of the processes associated with displaying betting data associated with an exemplary sporting event compatible with the FIG. 1A.
Figure 4B:
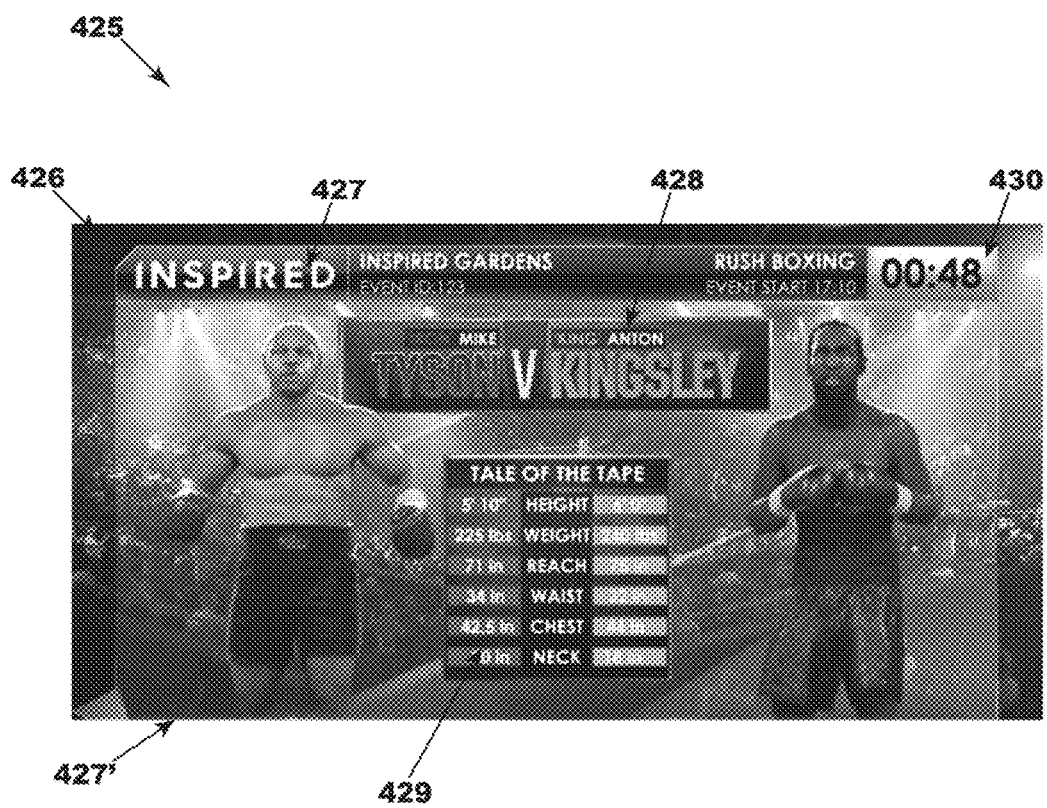
FIG. 4B is a first representative example of a high-resolution, digital backdrop video image with the pending state of FIG. 4A rendered superimposed over the backdrop.
Figure 4C:
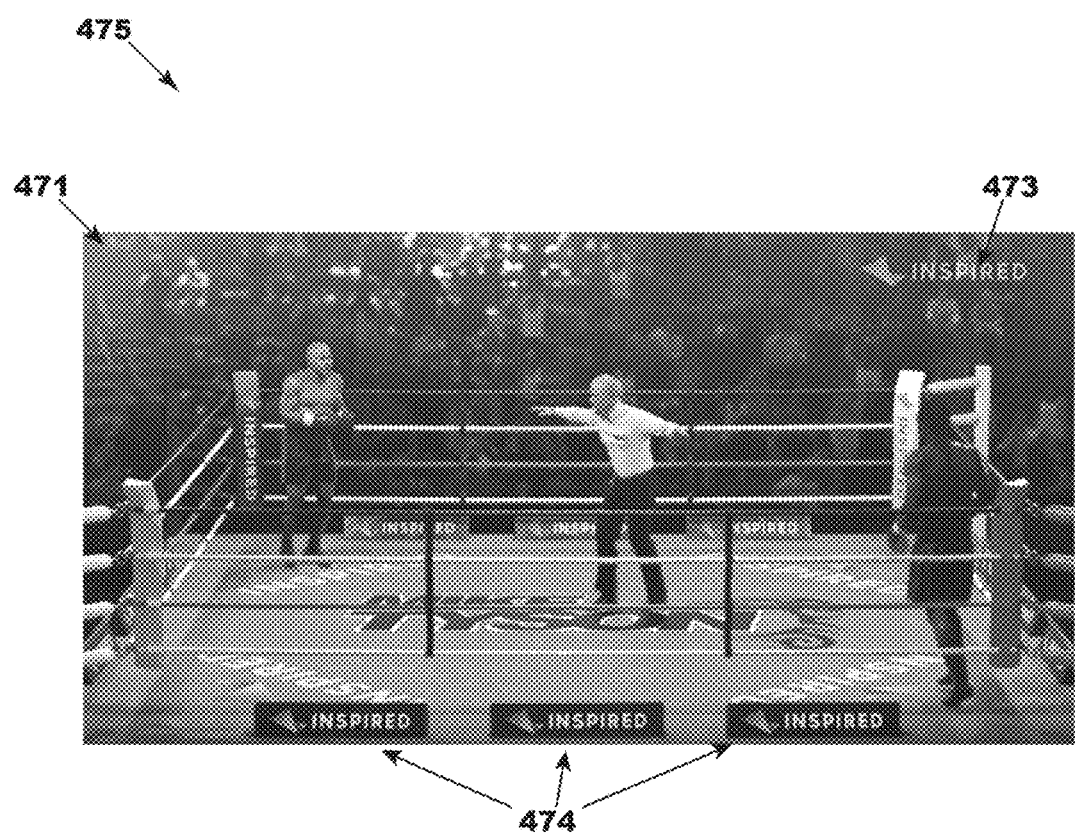
FIG. 4C is a second representative example of a high-resolution, digital backdrop video image with the running state of FIG. 4A rendered superimposed over the backdrop.

In the specific embodiment when a receiver is operated by a betting establishment, the venue unique data typically provides betting statistics for virtual or real sporting events—e.g., see 429 of FIG. 4B, 453 of FIG. 4C. In some embodiments, this betting statistics data will vary from venue to venue since the payout odds are typically driven by the bets logged at the venue—i.e., most betting establishments strive for a 50%/50% distribution of wagers, which effectively eliminates all risk in accepting wagers for the betting establishment (the winners are simply paid from the losing cache with the betting establishment withholding its take or "rake"). In addition to venue unique data, the specifications previously logged by the installer 106 (FIG. 1A) can be utilized to format venue specific data before it is displayed (e.g., time zone of the establishment; currency types such as "$", "€", "℈"; name of the venue; screen resolution of the display; comma "," or period "." used as thousand delimiter) that does not necessarily change the data itself rendered and displayed, but rather the manner that the data is rendered and displayed.

As is apparent to one skilled in the art, while this general embodiment discloses a system and method for combined simplex data stream communications, there are several other modes of operation (e.g., operating over half-duplex or full-duplex channels) that would be within the parameters of the present invention and its appended claims. Optionally, if a half or full duplex channel was employed, each receiver or STB could be configured to acknowledge each received data packet to the first remote server.

Figure 1B:
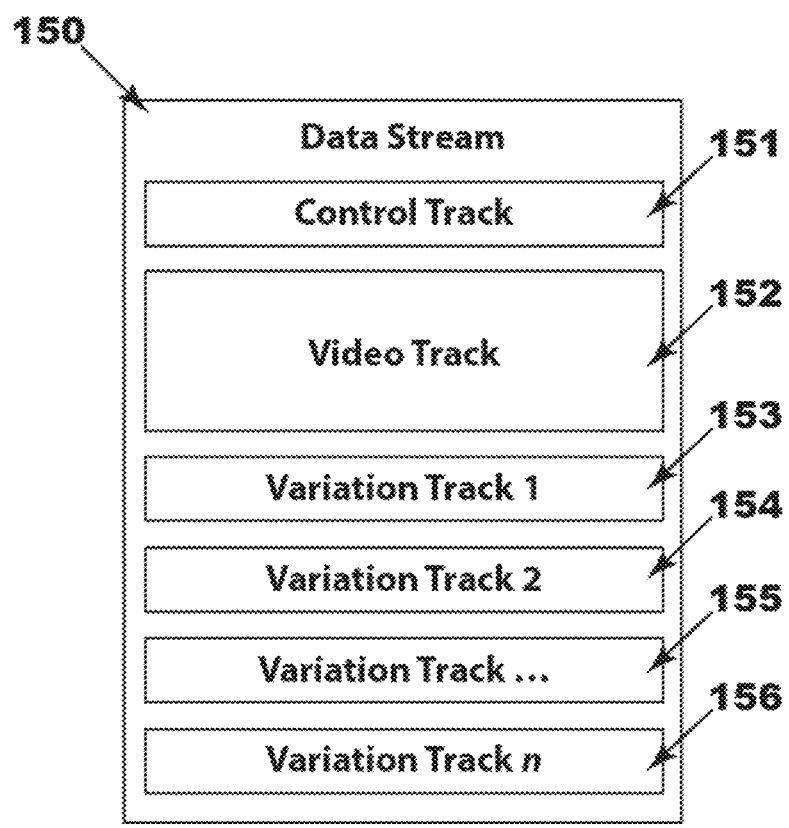
FIG. 1B is a system architecture diagram providing a schematic graphical overview of the general embodiment of FIG. 1A depicting the track allocation of the common broadcast signal.

A breakdown of track or channel allocation of the combined simplex data stream discussed in general embodiment 100 is provided in FIG. 1B. As illustrated in FIG. 1B, the overall combined simplex data stream 150 is comprised of a plurality of different tracks or sub-channels including:

i. a "control track" 151 that broadcasts per-receiver authorization codes and template updates to all receivers on the system;

ii. at least one "video track" 152 that is typically high-resolution and high-bandwidth constituting the common video element displayed on all receivers with no venue specific data or branding; and iii. an extendable plurality of "variation tracks" 153 through 156 (typically at least one variation track for each venue) containing the venue specific local overlay data required for a customized local rendering.

The control track 151 continuously streams two classes of data:

i. "authorization data" enrolling each individual receiver or STB, which will allow it to access and decrypt its associated variation track (e.g., 153 through 156); and ii. "templates" used to control and format the rendering of the decrypted variation track (e.g., 153 through 156) data to provide venue specific customization and local rendering (e.g., branding, formatting).

The control track 151 is comprised of a fixed portion of allocated bandwidth that is read by every receiver or STB on the system. Since the combined data stream 150 is primarily intended to support simplex operation, there are typically no acknowledgements or "ACKs" returned by the receivers or STBs. Thus, as is typical of all simplex systems, the transmitter must assume that the intended receiver has accepted and processed any appropriate authorization data or templates previously transmitted. This assumption can be problematic in noisy environments. Consequently, to increase the probability that all receivers or STBs in the system receive intended transmissions, a high degree of redundancy is incorporated into the system of the general embodiment. As disclosed later in FIG. 5, a portion of this redundancy can be achieved via "chunking" with embedded error detection and correction—e.g., Reed-Solomon. However, to provide maximum probability of successful receipt of all pertinent data before it is needed by the receiver or STB, authorization and/or template data will typically be broadcast on the control track 151 (FIG. 1B) well in advance of the time it will be needed. Additionally, after the initial broadcast of specific authorization and/or template data to a given receiver, this same data will be repeatedly broadcast whenever idle transmission time of the control track 151 occurs. Therefore, the control track 151 is ideally never idle at any time, and any available spare bandwidth is consumed with redundant broadcasts of previously transmitted authorization and/or template data that is still relevant. In transmission systems where a fixed amount of bandwidth is leased over a fixed time period (e.g., satellite transponder bandwidth), this added redundancy is effectively achieved at no additional costs since the leased fee is the same if the bandwidth is 0% to 100% utilized.

To ensure that the control track 151 is continuously utilized, individual data packets will be transmitted via four different queues varying in priority:

(1) The "authorization expedite" queue is the highest priority control track 151 queue. It is used to ensure that authorization data for recently enrolled receivers or STBs is transmitted as soon as possible after enrollment so that the receiver or STB can receive and decrypt subsequent template data and any applicable variation track data.

(2) The "authorization" queue is the second highest priority control track 151 queue. It is used to ensure that all receivers or STBs are receiving refreshed authorization keys well in advance of time period that an extant decryption key expires.

(3) The "template expedite" queue is the third priority control track 151 queue. It is used to ensure that the graphical templates for recently enrolled receivers or STBs are transmitted as soon as possible after enrollment so that the device can install and use the correct graphical template at the correct time.

(4) The "template" queue is the lowest priority control track 151 queue. It is used to cycle through updates of all templates, which can be installed and used in the foreseeable future.

The video track 152 is comprised of at least one common video data stream that is displayed by all receivers or STBs in the system. Typically, the common video track is a high-resolution sporting event (e.g., virtual or real boxing match, horse race, football or soccer match) and consequently, consumes a majority of the system's available bandwidth. Thus, the present invention reserves its bandwidth intensive data for communal usage by all receivers and STBs in the system with the lower bandwidth data providing the venue customization. Consequently, the general embodiment of the present invention is inherently efficient in terms of video quality and costs. Standard digital container formats for transmission of audio and video (e.g., "Motion Picture Expert Group Transport Stream" or "MPEG-TS") can support the transmitting of a plurality of different video data streams at the same time. In embodiments where a plurality of video data streams are simultaneously transmitted on the video track 152, the associated ancillary track data will instruct the receiver which specific video data stream to render. In this manner, the same video track 152 may be used to transmit multiple events (e.g., a virtual or real boxing match, and a horse race, and a football or soccer match) to different sets of receivers or STBs, while still allowing for venue localized data to be sent to specific receivers or STBs for the same event.

Finally, the variation tracks 153 through 156 transmit all venue localized data to specific receivers or STBs. The variation track 153 through 156 for a given receiver or STB is assigned as part of the authorization data.

Figure 2A:
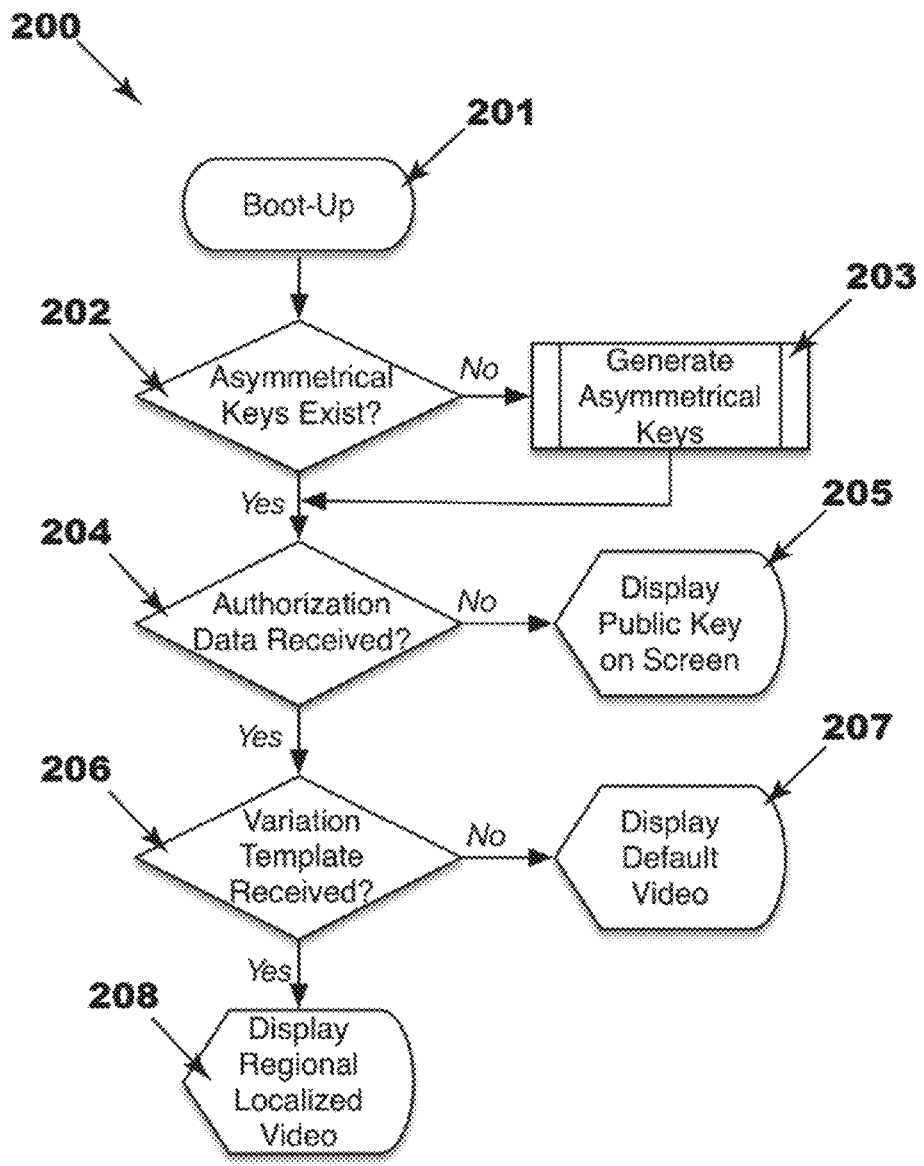
FIG. 2A is a flowchart providing a schematic graphical overview of the general embodiment of FIG. 1A from the perspective of a specific receiver as applied to enrollment into the broadcast system.
Figure 2B:
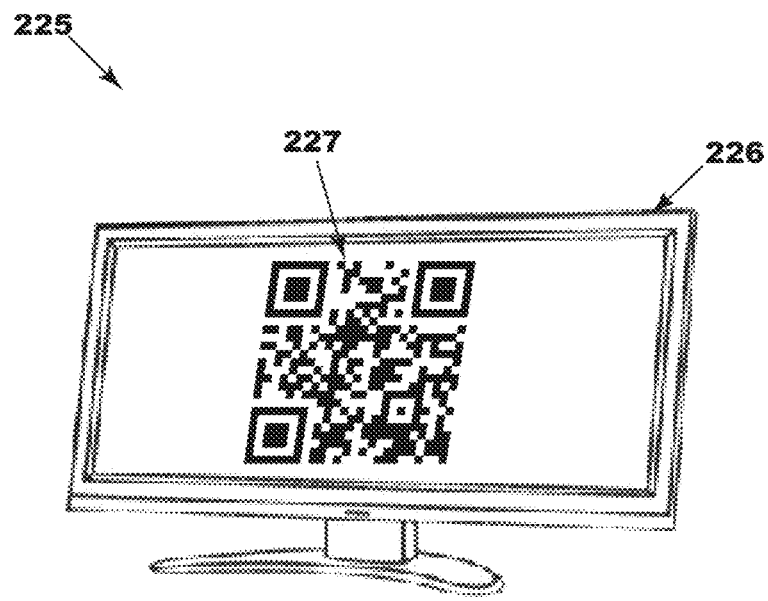
FIG. 2B is a front elevation view of the representative example of a receiver's public key displayed in a two-dimensional barcoded format at boot up.
Figure 2C:
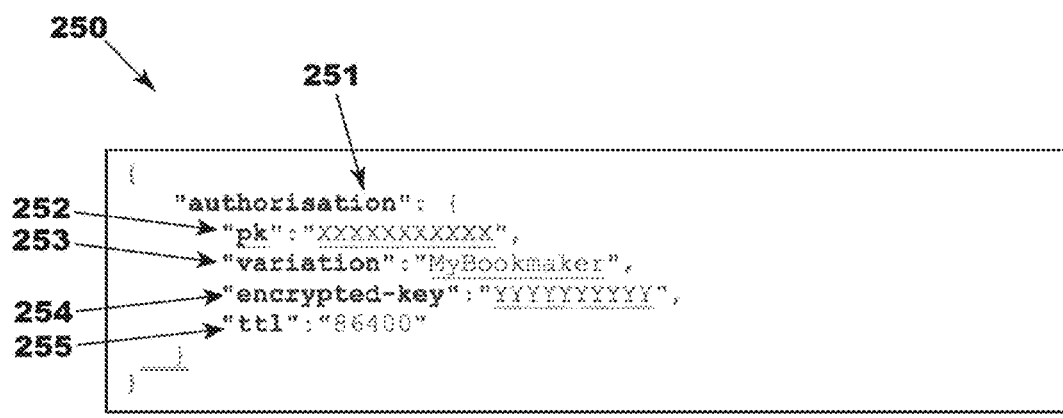
FIG. 2C is an exemplary view of a first representative example of a snippet capable of authorizing an individual receiver to receive broadcast data that is compatible with the general embodiment of FIG. 1A.

FIGS. 2A, 2B, and 2C taken together, illustrate the individual receiver or STB 101 through 103 (FIG. 1A) authorization and enrollment process of the present invention. FIG. 2A is a flowchart 200 providing a schematic graphical overview of the general embodiment 100 of FIG. 1A from the perspective of a specific receiver or STB as applied to enrollment into the broadcast system. FIG. 2B is a detailed front elevation view 225 of the representative example of a receiver's public key displayed in a two-dimensional barcoded format 227 at boot-up on the associated display 226 that was generally illustrated 101' in FIG. 1A. FIG. 2C is an exemplary view of a first representative example of a snippet 250 capable of authorizing an individual receiver or STB to receive broadcast data after it has been enrolled on the system's second remote server 105 and first remote 104 server (FIG. 1A).

Flowchart 200 of FIG. 2A begins with device boot-up 201 when the device's preloaded software or application first checks to determine if it has an existing asymmetrical public and private key pair 202. If no asymmetrical key pair is detected, the device will generate its own asymmetrical key pair 203 using its internal Random Number Generator (RNG) or Pseudo Random Number Generator (PRNG). Once an asymmetrical public and private key pair is available, the device then checks to determine if it has been previously authorized (i.e., enrolled) on the system 204 by checking for the presence of authorization data in its local memory.

If no authorization data is found, the device will display its public key on its associated display 205, preferably in both human and machine readable formats. Since the public key needs to be copied from the display and encoded into the installer's enrollment device to ultimately be transmitted to the second remote server 105 (FIG. 1A) to complete enrollment, showing the public key 225 (FIG. 2B) in a machine readable two-dimensional barcode format 227 on the display screen 226 is preferable to only human readable formats, since asymmetrical public keys are typically 2,048 bits in length and consequently extremely difficult for a human to encode without error. Thus, showing the public key 225 on the display screen 226 in a two-dimensional barcoded format (e.g., Aztec with 1,914 byte capacity, Quick Response or "QR" code with 2,952 byte capacity in alphanumeric format) would allow for the public key to be transferred readily with ample amounts of error detection and correction. Once the public key 225 is scanned and transmitted with associated supplementary specifications (e.g., name and address of the establishment, country of the establishment, time zone of the establishment, affiliation of the establishment) to the second remote server 105 (FIG. 1A), the authorization process is initiated with the first remote server 104 transmitting 108 the authorization data to the receiver or STB 101 that disclosed its public key 225 (FIG. 2B) on its display screen 226.

An exemplary authorization snippet 250 capable of authorizing an individual receiver or STB to receive broadcast data is illustrated in FIG. 2C. As shown in FIG. 2C, the format for the authorization data is a generic header 251, thereby categorizing the subsequent data as authorization data for a receiver or STB identified by its public key or "pk" 252. The "variation" data field 253 designates the names of the variation track and graphical templates to be utilized by the receiver or STB. Other splits or sub levels are possible within the variation data field 253, possibly allowing different receivers or STBs within the same venue to share the same white labeled data. The "encrypted-key" data field 254 is the symmetrical decryption key for the designated receiver or STB's variation track, which is typically encrypted with the receiver's or STB's public key or "pk" 252. Finally, the "ttl" data field 255 denotes the time period the enclosed symmetrical key should be utilized. With this configuration, the receiver or STB will be required to retain the authorization data 250 for the duration of the "ttl" 255 and not necessarily discard any symmetrical decryption key and other information when newer information is transmitted. Among other benefits, this allows a new symmetric decryption key for a given variation track to be transmitted in advance of changing the decryption of the variation track. The receiver or STB will therefore attempt all decryption keys with a valid "ttl" 255 on any data received on its designated variation track, starting with the most recent. Thus, a seamless transition can be achieved from one symmetrical key to another, while allowing regular change of the shared key. Of course, it is preferable that at least portions of the authorization data 250 be encrypted with the receiver's or STB's asymmetrical public key, thereby enhancing the security, integrity, and identity of the associated data—e.g., encrypting the symmetrically key with the asymmetrical public key of the device.

An authorization snippet 250 is merely one example of how a receiver or STB can be authorized to received broadcast data. Other configurations and supplementary data fields are possible and in some instances desirable. For example, in a preferred embodiment, an additional formatting data field is included that defines formatting of the subsequent data to be displayed (e.g., time zone of the establishment; currency types such as "$", "€", "£"; name of the venue; screen resolution of the display; comma "," or period "." used as thousand delimiter). This data field does not necessarily change any subsequent data itself, but rather only changes the formatting of how the subsequent data is rendered and displayed. This embodiment is preferred because format data definitions are relatively static and therefore not frequently changed. Thus, to minimize bandwidth consumption, formatting data definitions can usually be transmitted only once at the time of authorization.

As is also apparent to one skilled in the art, the exemplary authorization snippet 250 is shown written in JavaScript® Object Notation ("JSON") for ease of reading and familiarity. However, in practice, another data protocol with less bandwidth overhead would be preferable, such as "Protocol Buffers."

Referring again to FIG. 2A, once the authorization data is received 204, the device checks to determine if any associated variation templates have also been received 206. If no variation templates have been received at this time, the receiver or STB will display the video track 152 (FIG. 1B) without any venue customized additional data 207 (FIG. 2A). Alternatively, when variation templates are received and stored into local memory, the receiver or STB will display the re-rendered video track with venue specific local customized data 208.

Figure 3:
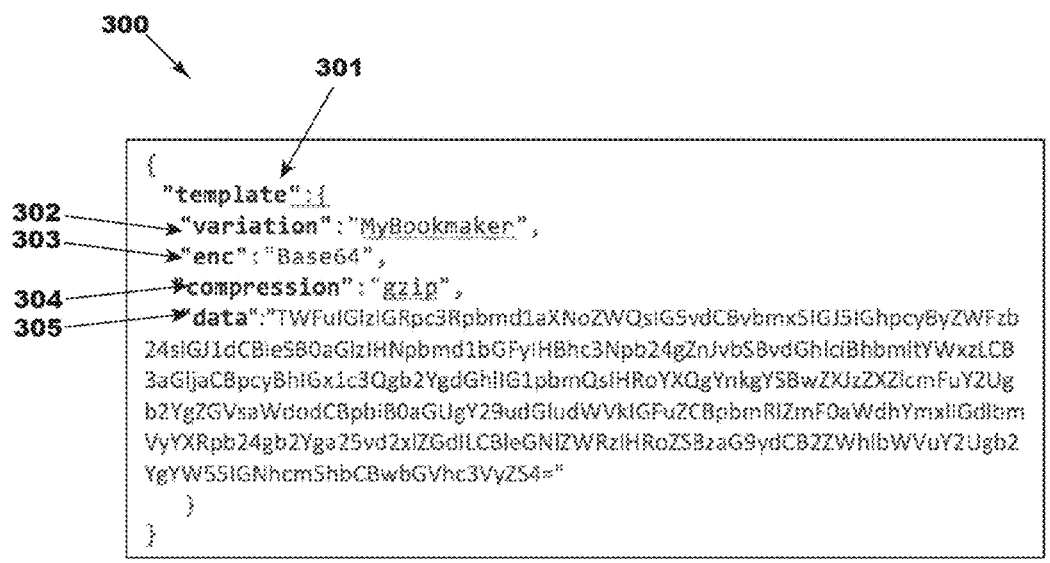
FIG. 3 is an exemplary view of a first representative example of a snippet for transmitting a graphics template to an individual receiver that is compatible with the general embodiment of FIG. 1A.

An exemplary view 300 of a graphics template snippet is illustrated in FIG. 3. As with the authorization data field of FIG. 2C, the graphics template data field includes a header 301 (FIG. 3) identifying it to the receivers or STBs. The "variation" field 302 references the variation track to be used and is selected from a possible subset of the "variation" field 253 (FIG. 2C) in the authorization data. The "enc" field 303 (FIG. 3) denotes how the binary data is encoded with the "compression" field 304 specifying the compression (if any) processed on the raw binary data. Of course, both the "enc" 303 and "compression" 304 fields would both have default values in order to avoid unnecessary bandwidth utilization. Finally, the "data" field 305 encodes the template itself which is compressed and encoded as specified by the "enc" 303 and "compression" 304 fields or their defaults. Again, the exemplary template snippet 300 is shown written in JSON for ease of reading and familiarity. However, in practice, another data protocol with less bandwidth overhead would be preferable, such as "Protocol Buffers."

As before, the graphics template snippet 300 provides only one example of how a receiver or STB can be authorized to received broadcast data. Other configurations and supplementary data fields are possible and in some instances desirable. For example, in an alternative embodiment, an additional formatting data field is also included that defines formatting of the subsequent data to be displayed that does not necessarily change any subsequent data itself, but rather the formatting of how the subsequent data is rendered and displayed. This embodiment is an alternative to the preferred embodiment of including a formatting data field within the authorization data. This alternative embodiment has the advantage of greater flexibility of changing formatting data, with the disadvantage of higher bandwidth consumption due to repeated retransmission of formatting data.

A key element of the present invention is that the graphics template and ancillary data collected by the receiver or STB can be synchronized, not just to an individual venue but also in coordination with specific states or time periods of the video track 152 (FIG. 1B). This coordination of the video track 152 with specific graphic templates 300 (FIG. 3) ensures that the correct data is displayed at the correct time of the video broadcast—e.g., displaying the race results of a virtual horse race while bets were still being accepted would constitute a catastrophic failure for a betting establishment. While it is typical to display one graphic template 300 for each video state, it is also possible to have multiple events within an individual video state—e.g., allow betting prices to be updated during a preamble where odds are not fixed.

Figure 4D:
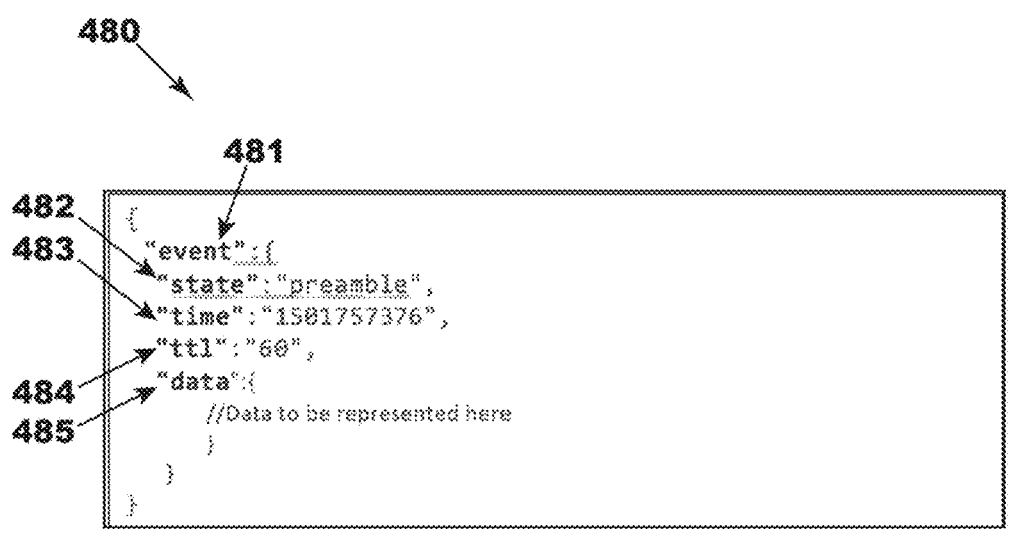
FIG. 4D is an exemplary view of a first representative example of a snippet for transmitting the preamble state ancillary data t that is compatible with the general embodiment of FIG. 1A and the specific example of FIG. 4C.

FIGS. 4A, 4B, 4C, and 4D taken together, provide exemplary illustrations of a virtual boxing match progressing through its various states that is compatible with the present invention. FIG. 4A is a state machine 400 providing a schematic graphical overview of the various states (401 through 408) of the exemplary virtual boxing match. FIG. 4B is a rendered, composite, digital video image 425 illustrating the graphics template 427 and associated ancillary data 429 rendered with the high-resolution video backdrop 426 that are compatible with the pending state 402 of FIG. 4A. FIG. 4C is a second rendered, composite, digital video image 475 illustrating the graphics template and associated ancillary data 473 and 474 rendered with the high-resolution video backdrop 471 that are compatible with the running state 405 of FIG. 4A. Finally, FIG. 4D is an exemplary view of a first representative example of an event snippet 480 capable of synchronizing graphics templates and associated ancillary data with the various states of a digital data stream.

With the example of the virtual boxing match state machine 400 of FIG. 4A, the virtual match progresses from an initial state 401 where the accompanying video feed is sequenced through five serial states (402 through 407) associated with the virtual boxing match video data, culminating in an end state 408 where the virtual boxing match is concluded. An optional cancelled state 406 is provided in the event that the virtual boxing match is abandoned during the pending 402, preamble 403, or no more bets 404 states.

After the virtual boxing match video starts 401, the video feed data displays a pending state 402 background 426 (FIG. 4B) with a typical layout designed to leave space for a synchronized graphic template rendered overlay 427 that may include translucent portions 427' as specified by the graphics template data. Typically, a pending state 402 (FIG. 4A) graphics template overlay will include: branding, a title of the virtual sporting event 428 (FIG. 4B), detailed ancillary data 429, and a clock countdown 430 indicating the amount of time remaining in the pending state 402 (FIG. 4A).

Once the time period for the pending state 402 expires, the video data progresses to its preamble state 403. Typically, the preamble state 403 will be very similar to the pending state 402 with the exception that the preamble state 403 usually displays bet data (e.g., odds, payoff) associated with the virtual sporting event. After the preamble state 403 betting period concludes, the video data and state machine progresses to the no more bets state 404. This usually short state allows for all betting accounts to be settled and provides a countdown for the consumers before a virtual or real sporting event begins.

After the no more bets state 404 terminates, the video data and state machine progress to the running state 405. In this state 405, the actual virtual sporting event plays out 475 (FIG. 4C) concluding with a winner. The graphic templates 473 and 474 for the running state 405 (FIG. 4A) are normally smaller and less obtrusive (possibly displaying only branding data for the local betting establishment) with most of the rendering screen space devoted to the video data 471 (FIG. 4C).

After the running state 405 (FIG. 4A) ends, the video and state machine progress to the results state 407 in which the final results of the virtual sporting event is displayed. The final results graphics template usually includes the overall results, specifics about the virtual sporting event, branding, and a countdown clock until the next virtual sporting event begins. When the results state 407 terminates, the virtual sporting event ends at its final state 408 with the digital data feed starting a new virtual sporting event.

Alternatively, if for some reason (e.g., insufficient bets made, scheduling error, real sporting event illness of a participate) the virtual sporting event is cancelled during the pending 402 through no more bets 404 states, the state machine progresses to a cancelled state 406 where the video data displays some indicia indication the cancellation and the synchronized graphic template may contain refund information for the consumers. However, the normal state machine flow for the exemplary virtual boxing match is to sequence through five serial states (402 through 407).

An exemplary view 480 of an event template snippet is illustrated in FIG. 4D. As with the previous templates, the event template data field includes a header 481 identifying it to the receivers or STBs. The "state" field 482 references the state in which the template will be used. It is possible to include multiple events within the same state to allow for dynamic changes in the ancillary data—e.g., betting prices may be updated during the preamble state 403 (FIG. 4A) when the odds are not fixed. The "time" field 483 (FIG. 4D) denotes the time the event template will be implemented with the "ttl" data field 484 denoting the time period the template should be utilized. Lastly, the "data" field 485 is the ancillary data itself. This data field 485 can vary considerably according to the virtual or real sporting event broadcast as well as the associated state. As before, the exemplary template snippet 480 is shown written in JSON for ease of reading and familiarity. However, in practice, another data protocol with less bandwidth overhead would be preferable, such as "Protocol Buffers."

Figure 5:
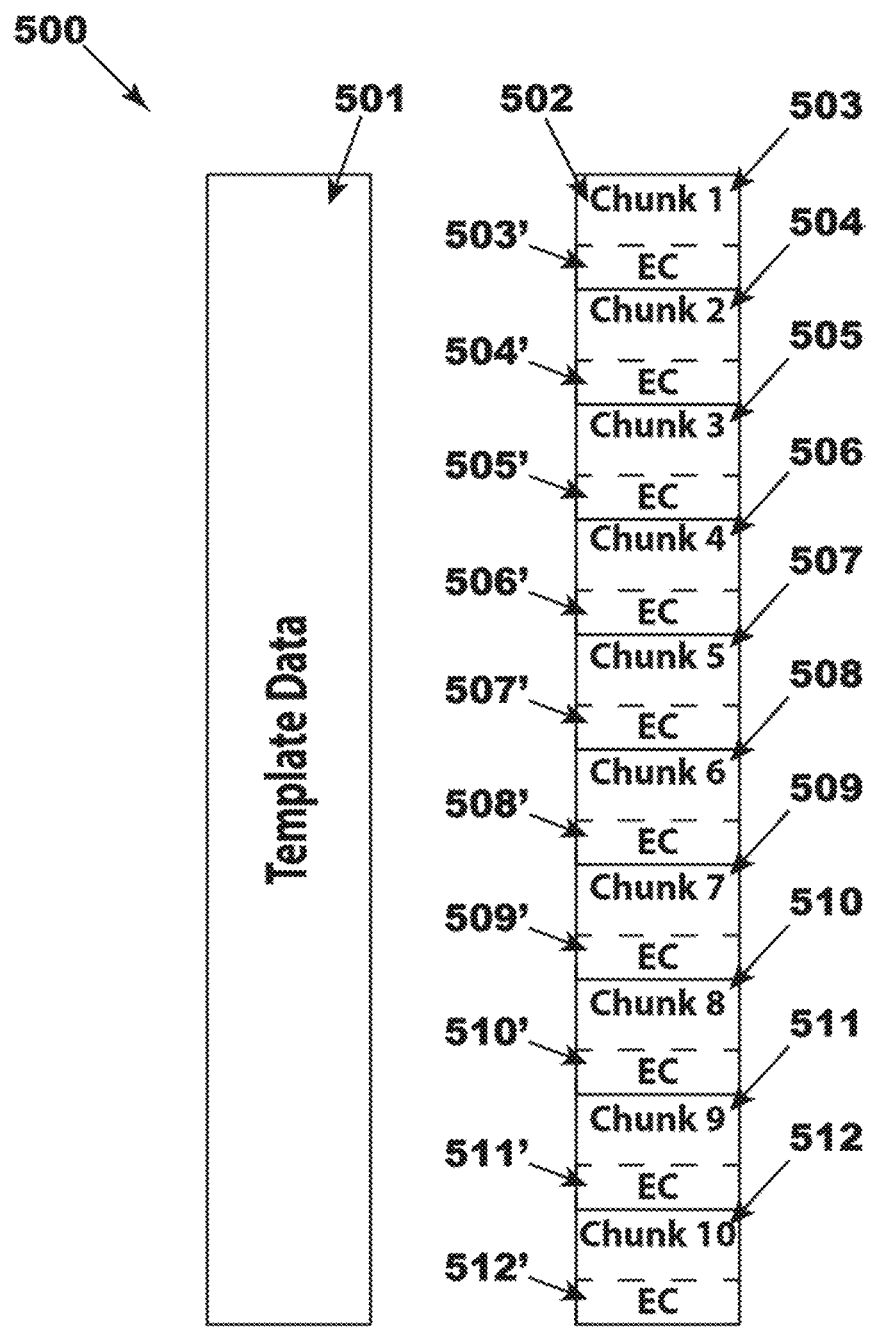
FIG. 5 is a block diagram providing a schematic graphical overview of the error correction and detection compatible with the general embodiment of FIG. 1A.

In addition to redundant broadcast over the control 151 and variations (153 through 156) tracks of FIG. 1B, FIG. 5 symbolically illustrates 500 an exemplary generic data template 501 and how that generic data template is preferably broken-up into smaller "chunks" 502, each "chunk" with its own error identification and correction coding. With this embodiment, the "chunking" and individual block error correction is highly desirable due to the simplex nature of the system. By "chunking" overall generic data (503 through 512) above a predetermined size, the size of each "chunked" data packet is reduced and therefore the probability of random noise interfering with that specific data packet is also reduced. When it is realized that each "chunked" data packet (503 through 512) is formatted with its own error detection and correction segment (503' through 512') then the probability of an uncorrectable noise error persisting through the transmission diminishes greatly. Thus, the combination of "chunked" data with error correction greatly increases the reliability of the simplex system. Preferably the "chunking" and error correction would be executed by known existing protocols such as UFTP (User Datagram Protocol or "UDP" File Transfer Protocol) for "chunking" and Reed-Solomon for error correction.

Of course, there are other variations of the disclosed embodiments (e.g., transmitting the disclosed system over a full-duplex channel) that would be apparent to anyone skilled in the art in view of the present disclosure, and would be within the parameters of the appended claims.

What is claimed is:

1. A method of broadcasting a data stream generated by a first remote server, the broadcasted data stream including (i) a video track including a video data stream, (ii) a control track, and (iii) a plurality of ancillary data tracks including ancillary data, the broadcasted data stream being received by a plurality of receivers, each of which process selected portions of the broadcasted data stream for display on a display device, each of the receivers including an application program, each of the receivers having a unique public key, the method comprising:
   (a) authorizing each of the plurality of receivers to process the selected portions of the broadcasted data stream by enrolling the unique public key of each of the plurality of receivers with a second remote server;
   (b) individually defining specifications for each of the plurality of receivers and storing the individually defined specifications in the second remote server, at least some of the specifications being used to configure the ancillary data tracks for the respective receiver, the specifications including a unique name for the respective receiver;
   (c) creating, using the first remote server, unique authorization data for each of the respective receivers using at least the unique public key for the receivers;
   (d) assigning, by the first remote server, a template to each of the respective receivers based on:
      (i) the selected specifications,
      (ii) a type of the video data stream, and
      (iii) a state of the video data stream;
   (e) broadcasting an assembled control track including:
      (i) the unique authorization data created in step (c), and
      (ii) the templates assigned in step (d);
   (f) broadcasting the video data stream and the plurality of ancillary data tracks;
   (g) the plurality of receivers receiving the assembled control track, the video data stream and the plurality of ancillary data tracks; and
   (h) each of the plurality of receivers rendering a composite video image for display on the display device, the composite video image including the video data stream, the template assigned to the respective receiver, and the ancillary data, wherein the template is populated with the ancillary data.

2. The method of claim 1 wherein the data stream is broadcasted to a plurality of different venues, each receiver being associated with one of the venues, each venue being associated with the same template.

3. The method of claim 2 wherein at least one of the venues has a plurality of associated receivers, and wherein the same template is allocated for each of the receivers in the same venue, thereby resulting in the same composite video image being rendered by each of the receivers associated with the same venue.

4. The method of claim 3 wherein at least one of the venues has multiple geographically different locations with the venue's associated receivers located at the different locations, thereby resulting in the same composite video image being rendered by each of the receivers associated with the different locations of the same venue.

5. The method of claim 1 wherein the video track includes a plurality of different video data streams, each video data stream being associated with a different event.

6. The method of claim 5 wherein each template is associated with one or more of the different events, thereby rendering a composite video image that matches the event associated with the respective video data stream.

7. The method of claim 1 wherein the video data stream is associated with an event.

8. The method of claim 1 wherein the unique name for the receiver is the same as the unique public key for the receiver.

9. The method of claim 1 wherein the assembled control tracks are broadcast continuously, including at times where no video data stream or ancillary data tracks are being broadcast.

10. The method of claim 1 wherein the data stream is broadcasted to a plurality of different venues, each receiver being associated with one of the venues, and wherein the individually defined specifications include a name of venue and country of venue.

11. The method of claim 1 wherein the first remote server and the second remote server are the same remote server.

12. The method of claim 1 wherein the application program is an applet.

13. The method of claim 1 wherein the receiver is a set top box.

14. The method of claim 1 wherein the authorization data further includes for each receiver (iii) a symmetrical encryption key, the method further comprising:
   (i) encrypting the templates assigned in step (d) and the ancillary data in the plurality of ancillary data tracks with the symmetrical encryption key, the encryption keys being used by the receivers to decrypt the templates and the ancillary data received by the respective receivers.

15. The method of claim 1 wherein the receivers operate in simplex mode, and thus only receive data from the first remote server and do not send any data to the first remote server.

16. The method of claim 1 wherein the authorization data for each receiver further includes:
   (iii) formatting data.

17. The method of claim 1 wherein a template assigned to each of the respective receiver further includes:
   (iv) formatting data.

\* \* \* \* \*